US009977937B2

(12) United States Patent
Jones et al.

(10) Patent No.: US 9,977,937 B2
(45) Date of Patent: May 22, 2018

(54) MULTI-CAPABILITY APPARATUS SUPPORTING BACKGROUND RFID TAG-READING AND CORRESPONDING METHODS

(71) Applicant: Wal-Mart Stores, Inc., Bentonville, AR (US)

(72) Inventors: Nicholaus A. Jones, Fayetteville, AR (US); Jarrod L. Bourlon, Centerton, AR (US); Alvin S. Taulbee, Springdale, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days. days.

(21) Appl. No.: 15/433,553

(22) Filed: Feb. 15, 2017

(65) Prior Publication Data

US 2017/0243035 A1    Aug. 24, 2017

Related U.S. Application Data

(60) Provisional application No. 62/297,756, filed on Feb. 19, 2016.

(51) Int. Cl.
*H04Q 5/22* (2006.01)
*G06K 7/10* (2006.01)

(52) U.S. Cl.
CPC ................. *G06K 7/10366* (2013.01)

(58) Field of Classification Search
CPC ................................................ G06K 7/10366
USPC ... 340/10.1, 10.2, 5.65, 572.1, 10.42, 572.8, 340/10.52; 235/375, 385, 485
See application file for complete search history.

(56) References Cited

U.S. PATENT DOCUMENTS

| 7,145,437 | B2 | 12/2006 | Jalkanen |
| 8,310,366 | B2 * | 11/2012 | Stern .................. H04Q 9/00 340/572.1 |
| 8,805,722 | B1 | 8/2014 | Kleinmann |
| 8,830,035 | B2 | 9/2014 | Lindley |
| 9,704,124 | B2 * | 7/2017 | Jones .................. G06Q 10/087 |
| 2006/0221363 | A1 | 10/2006 | Roth |
| 2006/0238370 | A1 | 10/2006 | Park |
| 2007/0075142 | A1 | 4/2007 | Bellows |

(Continued)

FOREIGN PATENT DOCUMENTS

KR    20120001164    1/2012

OTHER PUBLICATIONS

Ukipo; App. No. GB1702564.5; Combined Search and Examination Report dated Jul. 31, 2017.

*Primary Examiner* — Dhaval Patel
(74) *Attorney, Agent, or Firm* — Fitch, Even, Tabin & Flannery LLP

(57) ABSTRACT

A portable multi-capability apparatus has a non-RFID capability and an RFID-tag reading capability. Upon determining that the apparatus is employing the non-RFID capability, the apparatus uses information regarding the non-RFID to determine a location of the apparatus. The apparatus then uses the RFID-tag reading capability in a ping mode of operation as a background task while also continuing to simultaneously use the non-RFID capability. When an RFID tag response to an RFID-tag reading ping, the apparatus correlates the RFID-tag response to the location of the apparatus is previously determined.

18 Claims, 2 Drawing Sheets

(56) References Cited

U.S. PATENT DOCUMENTS

| | | |
|---|---|---|
| 2007/0210159 A1* | 9/2007 | Mott ................... A61M 5/142 |
| | | 235/435 |
| 2009/0212915 A1* | 8/2009 | Ulrich ................ G06K 17/0022 |
| | | 340/10.1 |
| 2010/0259390 A1 | 10/2010 | Borcherding |
| 2011/0068906 A1 | 3/2011 | Shafer |
| 2011/0181392 A1 | 7/2011 | Cha |
| 2012/0119883 A1* | 5/2012 | Bekritsky .......... G06K 7/10356 |
| | | 340/10.4 |
| 2015/0213292 A1 | 7/2015 | Sun |
| 2015/0296332 A1 | 10/2015 | Lee |

* cited by examiner

MULTI-CAPABILITY APPARATUS SUPPORTING BACKGROUND RFID TAG-READING AND CORRESPONDING METHODS

CROSS-REFERENCE TO RELATED APPLICATION

This application claims the benefit of U.S. Provisional Application No. 62/297,756, filed Feb. 19, 2016, which is incorporated herein by reference in its entirety.

TECHNICAL FIELD

These teachings relate generally to radio-frequency identification (RFID)-tag readers.

BACKGROUND

RFID tags are known in the art. These so-called tags often assume the form factor of a label or a literal "tag" but are also sometimes integrated with a host article and/or its packaging. RFID tags typically comprise an integrated circuit and one or more antennas. The integrated circuit typically carries out a variety of functions including modulating and demodulating radio frequency signals, data storage, and data processing. Some integrated circuits are active or self-powered (in whole or in part) while others are passive, being completely dependent upon an external power source (such as an RFID tag reader) to support their occasional functionality.

Many prior art methodologies provide for installing RFID tag readers (and in particular the antennas for such readers) at certain chokepoints through which most or all tagged items at a given facility might be expected to pass. Other approaches are more aggressive and provide for effectively saturating (or at least attempting to saturate) a given facility with radio frequency energy in an effort to be able to read any RFID tag, any time, at any location within that facility. While effective to some degree, both such approaches are not wholly suitable to meet all needs of all potential users of such systems.

Building a system that attempts to illuminate every location within a given facility, for example, presents a very difficult challenge (in no small part due to maximum power limitations imposed on RFID tag readers by regulation and/or law and further by the fact that the operating environment will often tend to be highly dynamic with various bodies and surfaces moving from one location to another with corresponding effects upon the radio frequency environment from one spot to another). Accordingly, such an approach can represent both a considerable cost and also one that is subject to numerous frailties of the moment engendered by the dynamics of the application setting.

BRIEF DESCRIPTION OF THE DRAWINGS

The above needs are at least partially met through provision of a multi-capability apparatus supporting background RFID tag-reading and corresponding methods described in the following detailed description, particularly when studied in conjunction with the drawings, wherein.

Figure 1:
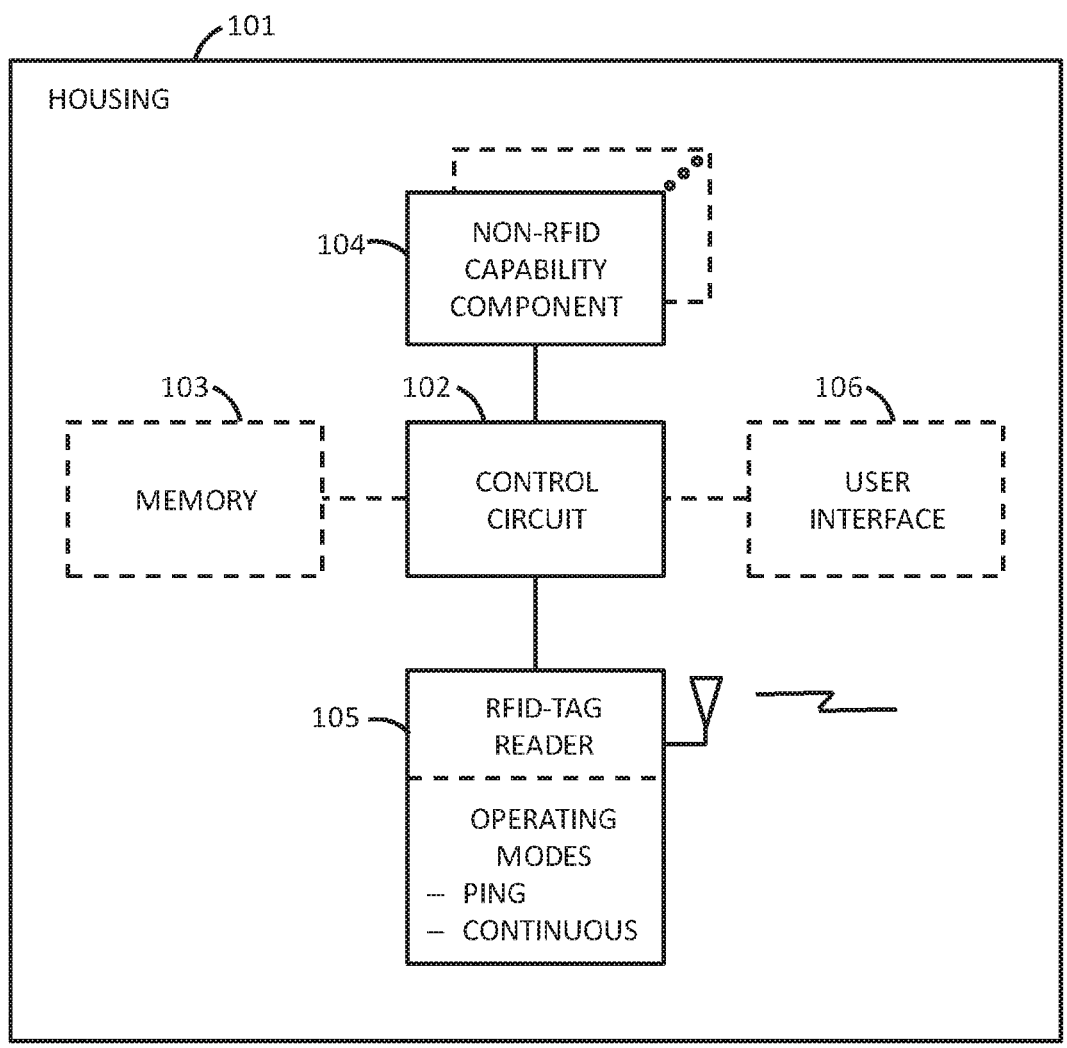
FIG. 1 comprises a block diagram as configured in accordance with various embodiments of these teachings.

Elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present teachings. Also, common but well-understood elements that are useful or necessary in a commercially feasible embodiment are often not depicted in order to facilitate a less obstructed view of these various embodiments of the present teachings. Certain actions and/or steps may be described or depicted in a particular order of occurrence while those skilled in the art will understand that such specificity with respect to sequence is not actually required. The terms and expressions used herein have the ordinary technical meaning as is accorded to such terms and expressions by persons skilled in the technical field as set forth above except where different specific meanings have otherwise been set forth herein.

DETAILED DESCRIPTION

Generally speaking, these various embodiments pertain to a portable multi-capability apparatus. At least one capability is a non-RFID capability while at least one other capability is an RFID-tag reading capability. Upon determining that the apparatus is employing the non-RFID capability, the apparatus uses information regarding the non-RFID to determine a location of the apparatus. The apparatus then uses the RFID-tag reading capability in a ping mode of operation as a background task while also continuing to simultaneously use the non-RFID capability. When an RFID tag responds to an RFID tag-reading ping, the apparatus correlates the RFID-tag response to the previously-determined location of the apparatus.

By one approach the aforementioned portable multi-capability apparatus comprises a hand-held apparatus. If desired, the aforementioned non-RFID capability comprises an active capability such as but not limited to printing, optical scanning, and/or hand keying.

By one approach the apparatus is configured to respond (during the aforementioned ping mode of operation) to an RFID tag response by switching to a continuous mode of operation for the RFID-tag reader as a background task (for the apparatus itself) while the multi-capability apparatus simultaneously uses the non-RFID capability. In such a case, and if desired, the apparatus can then be further configured to halt that continuous mode of operation when the multi-capability apparatus terminates use of the non-RFID capability.

So configured, any number of RFID tags can be read as a background activity while an associate attends to other activities that are supported by the reading device and activities have nothing to do with reading RFID tags. As an added benefit these teachings can correlate a present location of the device with RFID tags that respond to the background reading activity. This information, in turn, can be leveraged to develop and/or confirm not only an existing inventory of RFID-tag products but also to map those products to particular locations within a given facility.

These and other benefits may become clearer upon making a thorough review and study of the following detailed description. Referring now to the drawings, and in particular to FIG. 1, an apparatus 100 that is compatible with many of these teachings will be presented.

This apparatus 100 comprises a multi-capability apparatus and, in particular, a portable multi-capability apparatus such as a hand-held apparatus. As used herein, an apparatus is "hand-held" when the apparatus is sized and configured to be held during ordinary use using only a single normally-sized adult human hand.

In this illustrative example the multi-capability apparatus 100 includes a housing 101 that supports (for example, by containing) a number of components as illustrated. One such component comprises a control circuit 102. Being a "circuit," the control circuit 102 therefore comprises structure that includes at least one (and typically many) electrically-conductive paths (such as paths comprised of a conductive metal such as copper or silver) that convey electricity in an ordered manner, which path(s) will also typically include corresponding electrical components (both passive (such as resistors and capacitors) and active (such as any of a variety of semiconductor-based devices) as appropriate) to permit the circuit to effect the control aspect of these teachings.

Such a control circuit 102 can comprise a fixed-purpose hard-wired hardware platform (including but not limited to an application-specific integrated circuit (ASIC) (which is an integrated circuit that is customized by design for a particular use, rather than intended for general-purpose use), a field-programmable gate array (FPGA), and the like) or can comprise a partially or wholly-programmable hardware platform (including but not limited to microcontrollers, microprocessors, and the like). These architectural options for such structures are well known and understood in the art and require no further description here. This control circuit 102 is configured (for example, by using corresponding programming as will be well understood by those skilled in the art) to carry out one or more of the steps, actions, and/or functions described herein.

By one optional approach the control circuit 102 operably couples to a memory 103. This memory 103 may be integral to the control circuit 102 or can be physically discrete (in whole or in part) from the control circuit 102 as desired. This memory 103 can also be local with respect to the control circuit 102 (where, for example, both share a common circuit board, chassis, power supply, and/or housing) or can be partially or wholly remote with respect to the control circuit 102 (where, for example, the memory 103 is physically located in another facility, metropolitan area, or even country as compared to the control circuit 102).

This memory 103 can serve, for example, to non-transitorily store the computer instructions that, when executed by the control circuit 102, cause the control circuit 102 to behave as described herein. (As used herein, this reference to "non-transitorily" will be understood to refer to a non-ephemeral state for the stored contents (and hence excludes when the stored contents merely constitute signals or waves) rather than volatility of the storage media itself and hence includes both non-volatile memory (such as read-only memory (ROM) as well as volatile memory (such as an erasable programmable read-only memory (EPROM).)

By another optional approach (in lieu of the foregoing or in combination therewith) the control circuit 102 operably couples to a user interface 106. This user interface 106 can comprise any of a variety of user-input mechanisms (such as, but not limited to, keyboards and keypads, cursor-control devices, touch-sensitive displays, speech-recognition interfaces, gesture-recognition interfaces, and so forth) and/or user-output mechanisms (such as, but not limited to, visual displays, audio transducers, printers, and so forth) to facilitate receiving information and/or instructions from a user and/or providing information to a user.

In this illustrative example the control circuit 102 also operably couples to at least one non-RFID capability component configured to support a non-RFID capability. The present teachings are highly flexible in these regards. By one approach, for example, the non-RFID capability comprises an active capability such as, but not limited to, printing, optical scanning, and hand keying (where "hand keying" will be understood to refer to a user inputting information, such as alphanumeric information, with one or more digits or hand-held tools such as a stylus via a physical or virtual keyboard). Depending upon the needs and/or opportunities that tend to characterize a given application setting, this apparatus 100 can include a plurality of such non-RFID capability components that serve and support a variety of different non-RFID capabilities.

Additionally, and as also illustrated, the control circuit 102 operably couples to an RFID-tag reader 105. In this illustrative example RFID tag reader 105 comprises an active RFID-tag reader and accordingly transmits interrogation signals. Those interrogation signals can awaken or otherwise prompt an active RFID tag to respond with its own transmissions and/or can power and energize a passive RFID tag to prompt a response therefrom. This RFID-tag reader 105 has at least two discrete operating modes. The first operating mode comprises a ping mode of operation and a second operating mode comprises a continuous mode of operation. Further description in these regards appears further herein.

Figure 2:
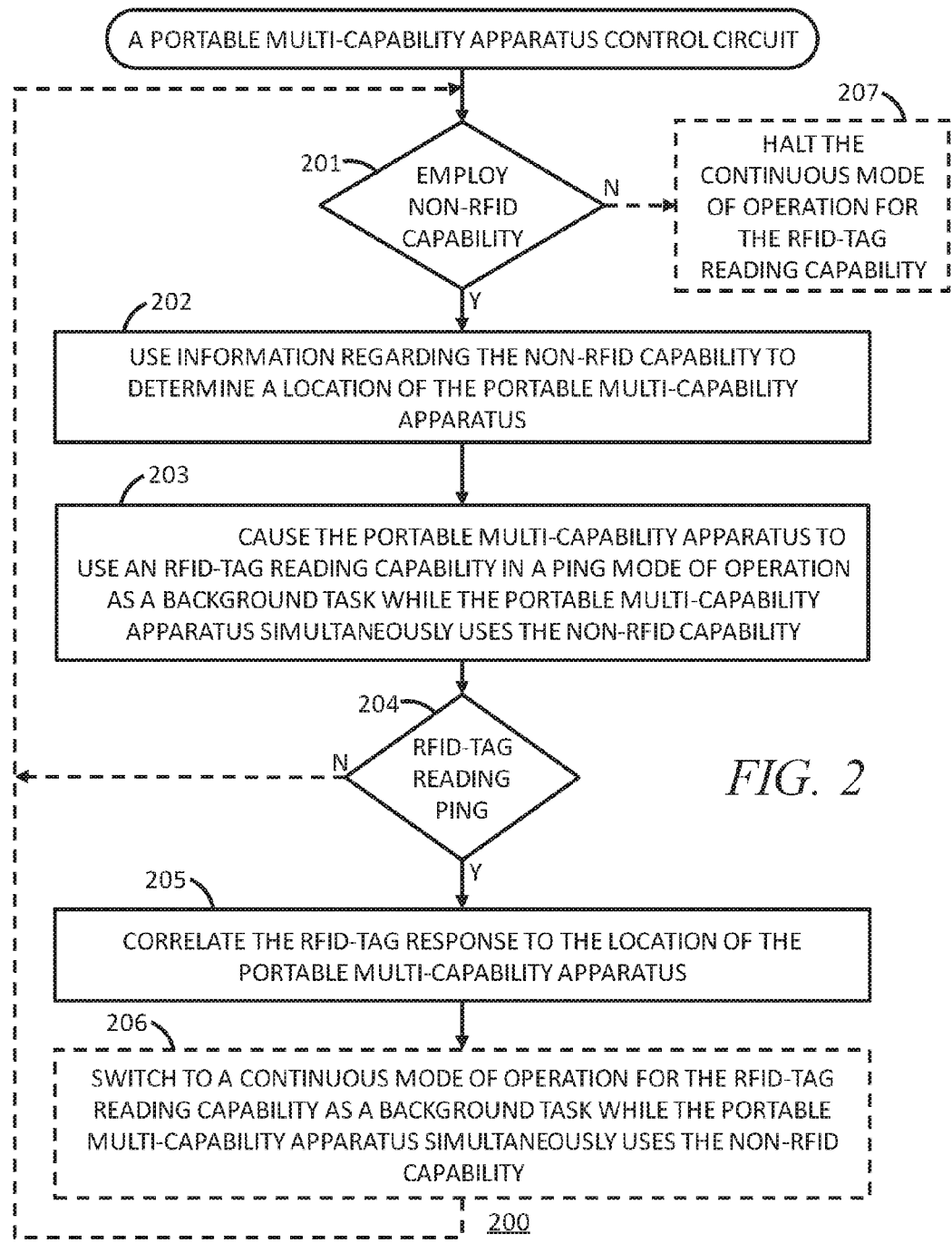
FIG. 2 comprises a flow diagram as configured in accordance with various embodiments of these teachings.

FIG. 2 presents a process 200 that can be carried out by such an apparatus 100.

At block 201 the control circuit 102 determines when the portable multi-capability apparatus 100 employs the aforementioned non-RFID capability. In many application settings it will be useful for the control circuit 102 to make this determination automatically. An automatic determination can be based, for example, upon automatically considering indicia of such activity on a periodic basis. As another example in these regards, in lieu of the foregoing or in combination therewith, a real-time interrupt triggered by such activity can prompt the control circuit 102 to make this determination.

When this determination reveals that the portable multi-capability apparatus 100 is currently employing a non-RFID capability, at block 202 the control circuit 102 uses information regarding that non-RFID capability to determine a location of the portable multi-capability apparatus 100. That information, for example, can comprise information that correlates the non-RFID capability to a location within a retail shopping facility.

As one example in these regards, an associate at the retail shopping facility may be tasked with printing new pricing labels for products located at a particular location within the retail shopping facility. When that associate begins to use a printing capability of the portable multi-capability apparatus 100, a presumption can be made that the associate is at the particular location where those products are located.

As another example in these regards, an associate at a retail shopping facility may be tasked with optically scanning optical codes on products located at a particular location within the retail shopping. When that associate begins to use an optical scanning capability of the portable multi-capability apparatus 100, a presumption can again be made that the associate is at the particular location where those products are located. (That presumption can be strengthened, if desired, by comparing the optical codes currently being read with the expected optical codes that correspond to that particular location.)

At block 203 the control circuit 102 causes the portable multi-capability apparatus 100 to use the aforementioned RFID-tag reading capability to interrogate RFID tags in the vicinity. This activity can be automatically prompted in response to the aforementioned determination that the portable multi-capability apparatus 100 is using the monitored non-RFID capability. (If desired, this automatically-initiated interrogation activity can be conditioned upon first making a determination whether there are likely any RFID tags at the determined location. For example, the control circuit 102 can use the determined location to access a map or other data store of information regarding where RFID tags are located at the retail shopping facility and when the portable multi-capability apparatus 100 is not presently located in an area where RFID tags are likely to be found this interrogation activity can be eschewed.)

By one approach the control circuit 102 uses this RFID-tag reading capability as a background task while the portable multi-capability apparatus 100 continues to simultaneously use the aforementioned non-RFID capability. As one example in these regards, although the portable multi-capability apparatus 100 may include a user interface 106 as described above, the apparatus 100 can nevertheless remain devoid of any external visually-perceptible (or audibly perceptible) indicia regarding any RFID-based capability of the apparatus 100. So configured, the associate using the apparatus 100 need not be aware that this background task is engaged.

Figure 3:
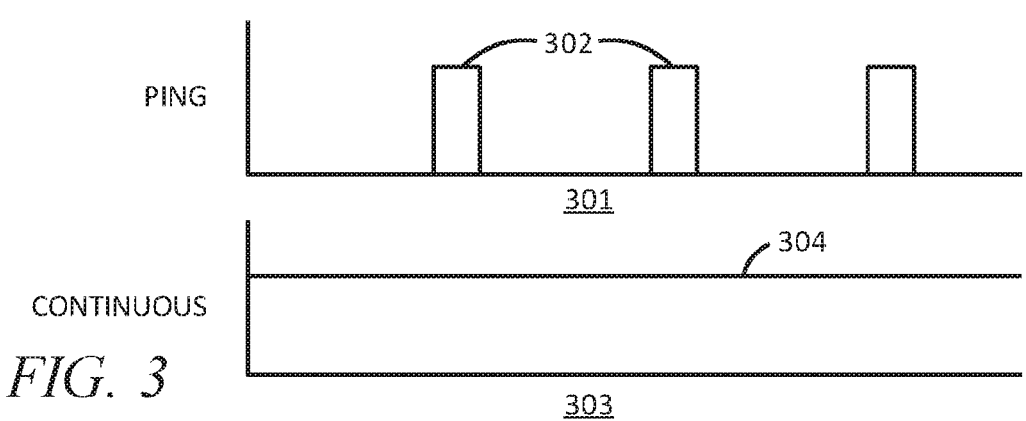
FIG. 3 comprises a pair of timing graphs as configured in accordance with various embodiments of these teachings.

By one approach the control circuit 102 causes the portable multi-capability apparatus 100 to use the RFID-tag reading capability in a ping mode of operation. Referring momentarily to FIG. 3, and as illustrated by the graph denoted by reference numeral 301, in a ping mode of operation the RFID tag reader 105 transmits its interrogation signal 302 using only intermittent pulses. These pulses will typically be considerably less than one second in duration but may have longer durations, such as two seconds or five seconds, if desired. In a typical application setting these pulses will have a fixed length (when there are no RFID tag responses). The intervening periods can similarly have a fixed duration such as one second, five seconds, 15 seconds, or such other duration as may be appropriate.

At block 204 the control circuit 102 determines when an RFID tag responds to the aforementioned RFID-tag reading interrogation ping. The control circuit 102 may be informed about such an event, for example, by the RFID-tag reader 105. In response, the control circuit 102 correlates the RFID-tag response to the location of the portable multi-capability apparatus 100 as was previously determined above.

As one simple example in these regards, the responding RFID tag may have an identifier that is unique (at least to some extent) to that particular responding RFID tag. The Electronic Product Code (EPC) as managed by EPCGlobal, Inc., for example, represents one such effort in these regards. EPC-based RFID tags each have an utterly unique serial number (within the EPC system) to thereby uniquely identify each tag and, by association, each item associated on a one-for-one basis with such tags. (The corresponding document entitled EPC Radio-Frequency Identity Protocols Class-1 Generation-2 UHF RFID Protocol for Communications at 860 MHz-960 MHz Version 1.0.9 (often referred to as "EPC GEN2") is hereby fully incorporated herein by this reference.) In such a case, that particular identifier can be correlated with the aforementioned previously-determined location in a corresponding database.

It is possible that the responding RFID tag is already associated with a particular location within, for example, a retail shopping facility. In that case, that previously-known location of the responding RFID tag can be used, if desired, to further inform the aforementioned determination regarding the present location of the portable multi-capability apparatus 100.

By one optional approach, and as shown at block 206, the control circuit 102 and/for the RFID-tag reader 105 can responsively automatically switch to a continuous mode of operation for the RFID-tag reading capability as a background task while the portable multi-capability apparatus 100 simultaneously uses the non-RFID capability. Referring again momentarily to FIG. 3, and as shown by the graph denoted by reference numeral 303, during a continuous mode of operation the RFID-tag reader 105 transmits its interrogation signal 304 on a continuous basis rather than on a pulsed basis as typifies the ping mode of operation. This approach can be particularly useful when only some, but not all, items in a retail shopping facility are tagged with a corresponding RFID tag. So configured, the apparatus 100 only transmits an interrogation signal on an occasional basis until a responding RFID tag provides an indication that the apparatus 100 is now possibly proximal to a group of products having such tags. This being so, the apparatus 100 can switch to a continuous mode of interrogation to read that plurality of tags.

With continued reference to FIGS. 1 and 2, at optional block 207 the control circuit 102 can halt the aforementioned continuous mode of operation for the RFID-tag reading capability in response to determining that the portable multi-capability apparatus 100 has terminated use of the aforementioned non-RFID capability. By one approach, if desired, this determination can be further based upon determining whether any RFID-tag responses are still being received when the non-RFID capability terminates. For example, in that case the control circuit 102 may persist the continuous mode of operation for the RFID-tag reading capability either until no further tags respond or, for example, some predetermined period of time (such as a particular number of seconds) expires following termination of the non-RFID capability.

So configured, a portable, handheld device employed by associate at the retail shopping facility can carry out any number of assigned non-RFID-based tasks that are associated with particular locations within the retail shopping facility. As these tasks are being carried out, the device occasionally, and only occasionally, transmits an RFID-tag interrogation signal. Upon receiving a salient response, the device can switch to a more aggressive reading state without disrupting either the associate's attention to the task at hand or the functionality of the non-RFID activity. Amongst other advantages this approach helps preserve battery life for the portable device by avoiding the use of battery power to transmit interrogation signals at a time when no useful responses are being received and/or when the response of a tag may not be helpful for lack of location information.

Those skilled in the art will recognize that a wide variety of modifications, alterations, and combinations can be made with respect to the above described embodiments without departing from the scope of the invention, and that such modifications, alterations, and combinations are to be viewed as being within the ambit of the inventive concept.

What is claimed is:
1. A multi-capability apparatus comprising:
a housing;

at least one component supported by the housing and configured to support a non-Radio-Frequency Identification (RFID) capability;

an RFID-tag reader supported by the housing;

a control circuit supported by the housing and operably coupled to the at least one component and the RFID-tag reader and configured to use the RFID-tag reader in a ping mode of operation as a background task while the multi-capability apparatus simultaneously uses the non-RFID capability, wherein the control circuit is configured to activate the RFID-tag reader in the ping mode of operation as a function, at least in part, of the multi-capability apparatus presently using the non-RFID capability.

2. The multi-capability apparatus of claim 1 wherein the multi-capability apparatus comprises a hand-held apparatus.

3. The multi-capability apparatus of claim 1 wherein the non-RFID capability comprises an active capability.

4. The multi-capability apparatus of claim 3 wherein the active capability comprises at least one of:
   printing;
   optical scanning;
   hand keying.

5. The multi-capability apparatus of claim 1 wherein the control circuit is further configured to respond during the ping mode of operation to an RFID tag response by switching to a continuous mode of operation for the RFID-tag reader as a background task while the multi-capability apparatus simultaneously uses the non-RFID capability.

6. The multi-capability apparatus of claim 1 wherein the apparatus is devoid of any external visually-perceptible indicia regarding any RFID-based capability of the apparatus.

7. A method for use with a portable multi-capability apparatus wherein at least one capability of the portable multi-capability apparatus is a non-Radio-Frequency Identification (RFID) capability and at least one capability of the portable multi-capability apparatus is an RFID-tag reading capability, the method comprising:
   by a control circuit:
      determining when the portable multi-capability apparatus employs the non-RFID capability and using information regarding the non-RFID capability to determine a location of the portable multi-capability apparatus;
      in response to determining that the portable multi-capability apparatus is employing the non-RFID capability, causing the portable multi-capability apparatus to use the RFID-tag reading capability in a ping mode of operation as a background task while the portable multi-capability apparatus simultaneously uses the non-RFID capability;
      when an RFID tag responds to an RFID-tag reading ping, correlating the RFID-tag response to the location of the portable multi-capability apparatus.

8. The method of claim 7 wherein the portable multi-capability apparatus comprises a hand-held apparatus.

9. The method of claim 7 wherein the non-RFID capability comprises at least one of:
   printing;
   optical scanning;
   hand keying.

10. The method of claim 7 further comprising:
responding during the ping mode of operation to an RFID tag response by switching to a continuous mode of operation for the RFID-tag reading capability as a background task while the portable multi-capability apparatus simultaneously uses the non-RFID capability.

11. The method of claim 10 further comprising:
halting the continuous mode of operation for the RFID-tag reading capability in response to the portable multi-capability apparatus terminating use of the non-RFID capability.

12. The method of claim 10 further comprising:
determining whether to halt the continuous mode of operation for the RFID-tag reading capability in response to the portable multi-capability apparatus terminating use of the non-RFID capability.

13. The method of claim 12 wherein determining whether to halt the continuous mode of operation for the RFID-tag reading capability includes determining whether any RFID-tag responses are still being received.

14. The method of claim 7 further comprising:
when an RFID tag responds to an RFID-tag reading ping, accessing information regarding a location of the RFID tag that provided the RFID-tag response and using that information to further determine the location of the portable multi-capability apparatus.

15. A method for use with a portable multi-capability apparatus wherein at least one capability of the portable multi-capability apparatus is a non-Radio-Frequency Identification (RFID) capability and at least one capability of the portable multi-capability apparatus is an RFID-tag reading capability, the method comprising:
   automatically determining when the portable multi-capability apparatus employs the non-RFID capability;
   in response to automatically determining that the portable multi-capability apparatus is employing the non-RFID capability, automatically causing the portable multi-capability apparatus to use the RFID-tag reading capability in a ping mode of operation as a background task.

16. The method of claim 15 further comprising:
using information that correlates the non-RFID capability to a location within a retail shopping facility to determine a location of the portable multi-capability apparatus.

17. The method of claim 16 further comprising:
when an RFID tag responds to an RFID-tag reading ping, correlating the RFID-tag response to the location of the portable multi-capability apparatus.

18. The method of claim 15 further comprising:
responding during the ping mode of operation to an RFID tag response by switching to a continuous mode of operation for the RFID-tag reading capability as a background task while the portable multi-capability apparatus simultaneously uses the non-RFID capability.

* * * * *